United States Patent
Levandoski et al.

(10) Patent No.: US 8,353,651 B2
(45) Date of Patent: Jan. 15, 2013

(54) DRY-TO-THE-TOUCH-MOISTURE-CURABLE COMPOSITIONS AND PRODUCTS MADE THEREFROM

(75) Inventors: Susan Lamtruong Levandoski, Bristol, CT (US); Shabbir Attarwala, Simsbury, CT (US); Alfred A. DeCato, Oakville, CT (US); Chris Ifeanyi Broderick, East Hampton, CT (US)

(73) Assignee: Henkel Corporation, Rocky Hill, CT (US)

( * ) Notice: Subject to any disclaimer, the term of this patent is extended or adjusted under 35 U.S.C. 154(b) by 7 days.

(21) Appl. No.: 13/075,683

(22) Filed: Mar. 30, 2011

(65) Prior Publication Data

US 2011/0176886 A1 Jul. 21, 2011

Related U.S. Application Data

(63) Continuation of application No. PCT/US2009/058517, filed on Sep. 28, 2009.

(60) Provisional application No. 61/101,516, filed on Sep. 30, 2008.

(51) Int. Cl.
*F16B 39/00* (2006.01)
(52) U.S. Cl. ......... 411/258; 411/82; 411/82.2; 411/914; 411/930

(58) Field of Classification Search ............... 411/82, 411/82.1–82.3, 258, 914, 930; 156/92
See application file for complete search history.

(56) References Cited

U.S. PATENT DOCUMENTS

| 4,111,890 | A | 9/1978 | Getson et al. | |
|---|---|---|---|---|
| 4,309,526 | A | 1/1982 | Baccei | |
| 6,423,810 | B1 | 7/2002 | Huang et al. | |
| 2005/0049340 | A1* | 3/2005 | Matsuo et al. | 524/210 |
| 2007/0123653 | A1 | 5/2007 | Attarwala et al. | |

FOREIGN PATENT DOCUMENTS

| EP | 1717254 | 11/2006 |
|---|---|---|
| JP | 06-206978 | 7/1994 |
| JP | 01-262112 | 9/2001 |

OTHER PUBLICATIONS

International Search Report for International Application No. PCT/US2009/058517 mailed on Apr. 27, 2010.

* cited by examiner

*Primary Examiner* — Roberta Delisle
(74) *Attorney, Agent, or Firm* — Steven C. Bauman

(57) ABSTRACT

A dry-to-the-touch moisture curing composition useful as a sealant and adhesive which includes a reactive modified methylene diisocyanate polymer component having isocyanate functionality of about 8% to about 18% by weight of the polymer.

13 Claims, No Drawings

DRY-TO-THE-TOUCH-MOISTURE-CURABLE COMPOSITIONS AND PRODUCTS MADE THEREFROM

FIELD OF THE INVENTION

The present invention relates to curable adhesive and sealant compositions in a dry-to-the-touch form. More particularly, the present invention relates to dry-to-the-touch adhesive and sealant compositions which incorporate a modified methylene diisocyanate prepolymer to provide moisture curing compositions which are particularly useful in threadlocking and sealing applications and may include various product forms including dry-to-the-touch tapes and gaskets.

BACKGROUND OF THE INVENTION

It is common practice in the use of threaded mechanical fasteners such as nut/bolt assemblies, to apply to one or more of the threadable engagement surfaces thereof, an adhesive/sealant composition termed a threadlocking composition, for the purpose of locking and/or sealing the constituent members of such fasteners when they are threadingly engaged.

Threadlocking compositions known in the art include co-reactive adhesive systems. With this type of threadlocking system, two or more components are mixed before applying the resulting composition to the threaded engagement surface(s) of the fastener on which the components in the threadlocking composition react to cure. Examples of such co-reactive systems include epoxy resin adhesive compositions.

Liquid adhesive compositions have long been used in sealing and threadlocking applications and have become a standard part of assembly production as well as in the maintenance of machinery, tools and the like. Among the liquid adhesive compositions commonly used in these applications are anaerobic compositions. These single part compositions provide excellent threadlocking and sealant properties and remain stable until they are placed between parts where they cure in the absence of air. Moreover, these compositions remain stable for long periods of time during storage in the bottle.

There are several other disadvantages associated with the use of conventional liquid anaerobic threadlockers, as well as prior non-flowable, thixotropic anaerobic-based threadlockers. One additional disadvantage is the inability of such compositions to cure through large gaps. Another disadvantage is that due to their anaerobic nature, portions of the adhesive which remain exposed to air once applied to the parts will not cure. For example, external bondlines which remain exposed to air on a nut and bolt assembly will remain liquid unless additional additives and cure measures are taken to ensure cure. As a result, liquid compositions at the external bondlines may tend to migrate. In the case of conventional non-flowable compositions, which depend on the thixotropic and/or rheological properties of the composition for their non-flowability, these compositions will flow if the temperature is high enough. Additionally, uncured materials may be easily extracted from such compositions by interaction with the environment. Such leaching of components from the compositions can create contamination problems and hazardous conditions for the surroundings.

It would be extremely useful and a significant advance in the field of reactive threadlockers and sealants, to provide a surface-independent reactive composition particularly useful for threadlocking applications, which overcomes the disadvantages of the prior art compositions. There is a need also for overcoming the disadvantages attendant the prior threadlocking compositions while providing a cost effective, dry-to-the-touch, easy to apply composition.

SUMMARY OF INVENTION

The present invention relates to compositions useful for adhesively fixturing matably engageable structural elements, such as threadlocking or bolt/nut assemblies or retaining applications, so that the structural elements are adhesively bonded and sealed upon their being engaged in a final interlocked state. The present invention broadly relates to a reactive adhesive/sealant composition, having particular utility for threadlocking matably engageable surfaces of threaded mechanical fasteners, or adhesive bonding of other matably engageable structural elements. More particularly, it has been discovered that moisture curing compositions which employ modified methylene diisocyanate polymers (modified MDI) having an NCO content of about 8% to 18% produce dry-to-the-touch sealants and adhesives having improved break/prevail strength within 48-72 hours cure time at room temperature, as well as improved break/prevail strength at high temperature (120°).

In one embodiment, there is provided a method of curing mated threaded parts including the steps of: (a) providing a composition including (i) a moisture curable polymer having an NCO content of about 8% to 18%, and more desirably about 16% to 18% by weight of the polymer; (ii) a moisture curable catalyst; and (iii) a reinforcement filler; (b) applying the composition to a threaded part; (c) mating the threaded part with another threaded part; and (d) permitting the composition to moisture cure. Desirably, the moisture curable polymer is an MDI polymer which has been modified with polyester and/or polyether units, e.g. a polyester or polyether backbone.

In another embodiment, there is provided a moisture curable threadlocking composition including: (a) a polyester or polyether modified methylene diisocyanate polymer present in amounts of about 30% to about 95% and having an NCO content of about 8% to 18%, and more desirably about 16% to 18% by weight of the polymer; (b) a moisture cure catalyst; and (c) a reinforcement filler; wherein the composition provides a break/prevail strength of at least about 100/10 in-lb after about 4 to about 8 hours of cure.

In other embodiments, there is provided a threaded assembly including: (a) a male threaded part matingly assembly with a female threaded part; (b) a threadlocking composition including: (i) a moisture curable modified MDI polymer having an NCO content of about 8% to 18%, and more desirably about 16% to 18% by weight of the polymer; (ii) a moisture curable catalyst; and (iii) a reinforcement filler.

Sealant compositions of the present invention have been shown to be especially effective in curing both "inside" and "outside" the bond line of the mating parts. The term "inside" the bond line refers to the mated area not exposed to air, and the term "outside" the bond line refers to the area not within the mated connection. The inventive compositions have been shown to have especially beneficial properties, such as being surface insensitive, dry to the touch, nonextractable in water and solvent, and providing the ability to a large cure through a large cure through gap (CTG) from about 0.05 mm to about 10.0 mm. These and other benefits will be realized to one of skill in the art practicing this invention.

DETAILED DESCRIPTION

The present invention broadly relates to a reactive adhesive/sealant composition, having utility for threadlocking matable engagement surfaces of threaded mechanical fasteners, or adhesive bonding of other matably engageable structural elements. Compositions of the present invention, in general, include a moisture curable modified (MDI) polymer (or pre-polymer) having an NCO content of about 8% to 18% by weight of the polymer, a moisture curable catalyst and a reinforcement filler. In some embodiments the NCO content is a residual content from the reaction by which it was made. In some embodiments the moisture curable polymer is a polyester modified MDI. Such polymers may provide cured polymers having polyester/urethane backbones. Various backbones may be present in the polymers provided they contain the reacted residual NCO content and permit dry-to-the-touch moisture cure. Desirably, the compositions provide break/prevail properties in the range of about 90/10 to about 300/10 inch-pounds (in-lbs) within a 4-72 hour cure time at room temperature.

In some embodiments, the modified MDI is a polyether modified MDI. Such polymers may provide cured polymers having polyether/urethane backbones. When used in threadlocking applications, the compositions have the advantage of being curable at areas between the parts, as well as areas of the bondline which are open to the air, i.e., not confined between the parts. This is a distinct advantage over traditional anaerobic threadlocking compositions, which are naturally inhibited from curing outside the bond line, i.e., open to the air. Suitable threadlocking applications include connections between nuts and bolts, gears, retaining rings, or other engageable parts. While described herein in terms of threadlocking compositions, the compositions of the present invention may also be useful in various other methods, such as in patching and/or sealing. Further, parts such as stand-alone gaskets may be made from the compositions, which can then be allowed to cure for later use.

The term "curing", or "cure" as used herein, refers to a change in state, condition, and/or structure in a material, as well as, partial and complete curing.

The term "active surfaces" indicates substrates or parts having iron or copper ions in them, such as steel, and which aid in curing of adhesive applied to their surface.

The term "inactive surfaces" indicates substrates which do not have metal ions which aid in the cure of adhesive applied to their surfaces, such as zinc, stainless steel or plastic.

Dry-to-the-touch means tack-free. The test to determine whether a composition has a tack-free, dry-to-the-touch property, a cured surface of the composition is dusted with talcum powder. The surface is considered tack-free or dry-to-the-touch if the talcum powder can be removed by light rubbing without causing the surface to become dull.

The term moisture curable "polymer" and "prepolymer" will be used interchangeably to mean a polymer which can be cured by moisture. The moisture curable polymer may have a variety of polymeric repeating groups or backbones, provided it has a residual NCO content in the range of about 8% to 18% by weight of the curable polymer and which allows for dry-to-the-touch cure outside of the bondline, i.e., in the open air. For example, the polymeric backbone may be formed from a polyester, polyether or a polyester/polyether copolymer. Alternatively, the backbone may be formed from a polyurethane, polyurea or a polyurethane/polyurea copolymer. Various copolymers of polyurethane, polyester and polyethers may also be employed.

Desirably, the moisture curable polymer is a polyester/polyurethane polymer, or a polyether/polyurethane formed from the reaction of a modified diisocyanate isocyanate and an alcohol, with a sufficient amount of excess NCO groups present such that about 8% to about 18%, and more desirably about 16% to 18% of the total NCO groups initially present remain unreacted and available for moisture cure. More particularly, useful modified diisocyanates include modified methylene diisocyanate (MDI) having polyester or polyether units. It has been found that modified MDI provides the desired cure properties and dry-to-the-touch characteristics outside the bondline, whereas other diisocyanates such as modified toluene diisocyanate (TDI) and modified hexamethylene diisocyanate (HDI) do not produce adequate cure and dry-to-the-touch properties.

Examples of useful moisture curable polyurethanes include those compounds having a repeating unit such as —[O—CONH—X—NH—COOR$^1$]-$_n$, where X is an aliphatic or aromatic hydrocarbyl or heterohydrocarbyl diradical group or chain and n is an integer from 1 to 25. $R^1$ is an alkylenyl or an arylenyl group. Polyurethanes having this formula desirably also include the residual NCO content as previously discussed.

One particularly useful moisture curable polymer is a prepolymer sold under the trademark Rubinate 9511 MDI, Huntsman Corporation, Houston, Tex. This material is described by the manufacturer as a modified diphenylmethane diisocyanate prepolymer having a residual NCO content of about 16% by weight of the prepolymer with an average NCO functionality of 2.4

Other useful moisture curable polymers include a low viscosity MDI prepolymer sold under the trademark Suprasec 9568 MDI, Huntsman Corporation, Houston, Tex. This material is described by the manufacturer as being a modified diphenylmethane diisocyanate, which has an average NCO functionality of 2.4. Other useful moisture curable polymers include those sold under the trade names Desmodure E-23A, Rubinate 1234, Rubinate 9234 and Rubinate 9272.

Preferably, the prepolymer backbone material has a viscosity of about 1000 to about 4000 centipoise (cP) at 25° C. (room temperature) and measured using spindle #20 at room temperature and most desirably has a viscosity of about 500 to about 25,000 cP at room temperature. The prepolymer backbone material desirably has a functionality of from about 2 to about 2.5, and most desirably about 2.4. Further, the prepolymer backbone desirably has an equivalent weight ranging from about 100 to about 400, desirably about 250 to about 270.

The compositions of the present invention include residual isocyanate groups on the moisture curable polymer. A variety of isocyanates may be employed in preparing the moisture curable polymer having excess isocyanate groups. The residual NCO groups may be the result of the particular isocyanate compounds used in formation of the backbone. For example, if the backbone has polyurethane groups or segments present, such a backbone may be formed from the reaction of an alcohol compound and an isocyanate compound. In such cases, the residual NCO groups may result from an excess stoichiometric amount of isocyanate compound such that unreacted NCO remains on the thus formed polyurethane backbone. Alternatively, the isocyanate groups may be added as pendent or end groups to a particular backbone.

Examples of useful polyisocyanates used to form polyurethane backbones having residual NCO groups include polymeric polyisocyanates such as those conforming to the general structure:

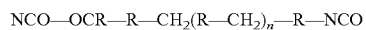

where R in each occurrence may be the same or different and may be a hydrocarbyl group or hetero hydrocarbyl group, wherein the hetero group may contain an oxygen, nitrogen or sulfur atom and n is 1-20.

Moisture curing polyurethane or polyurea polymers having residual isocyanates in the present invention may also be formed from the reaction product of an isocyanate and at least one compound selected from a multifunctional alcohol, a polyamine, a polythiol, and combinations thereof.

Examples of polyisocyanates useful in forming the moisture curable polymer include those corresponding to the formula:

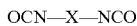

where X is a substituted or unsubstituted $C_{1-20}$ hydrocarbon diradical or a heterhydrocarbon diradical, where the hetero atom may be O, N or S. Desirably, X is an alkylene or an arylene group.

Isocyanates useful for forming the moisture curing polymer include methylene diisocyanates such as 4,4'-methylene diphenyl diisocyanate (MDI) and, 4,4'-diphenylene methane diisocyanate. It has been discovered that modified toluene diisocyanates and modified hexamethylene diisocyanates typically do not have the requisite NCO content and/or do not produce dry-to-the touch cured products in compositions of the present invention.

Still other reactants useful for forming the moisture curable polymer include those obtained by reacting polyamines containing terminal, primary and secondary amine groups or polyhydric alcohols, for example, the alkane, cycloalkane, alkene and cycloalkene polyols such as glycerol, ethylene glycol, bisphenol-A, 4,4'-dihydroxy-phenyldimethylmethane-substituted bisphenol-A, and the like, with an excess of any of the above-described isocyanates.

Useful alcohols for forming the moisture curable polymer include, without limitation, polyethyl glycol ethers having 3-7 ethylene oxide repeating units and one end terminated with an ether or an ester, polyether alcohols, polyester alcohols, as well as alcohols based on polybutadiene. One particularly useful alcohol is 1,4-butanediol. Additional useful alcohols include, without limitation, castor oil, glycerin, polyethylene glycol, etherdiol, ethylene glycol, caprolactone polyols and combinations thereof.

The adhesive compositions of the present invention are capable of curing in the presence of moisture at room temperature. Desirably, the compositions described herein are sufficiently cured at about 4 to about 8 hours after application. Further, the compositions described herein are fully cured after about 48 to about 72 hours, and are sufficiently stable to maintain an effective seal throughout the life of the threaded connection. Desirably, the cured composition has a break/prevail strength (inch-pounds) of from 100/10 to 300/100, depending on the particular material on which the composition is adhered and cured.

The one-part moisture curable compositions described herein are surface insensitive, and thus are capable of being adhered and cured to various surfaces. For example, the compositions may be adhered to metal substrates, such as steel, stainless steel, zinc, dichromate, cadmium, iron, and the like, or may be adhered to plastic or polymeric substrates.

The inventive compositions include a moisture curing polymer component containing the requisite NCO content, the polymer being present in an amount of from about 30 to about 95% by weight of the total composition.

Further, the compositions described herein include reinforcement fillers. Such fillers may be selected from a wide variety of materials capable of providing reinforcement, including calcium carbonate, organic tin and zinc compounds and aluminum oxide, hydrated alumina and silica, etc. Other reinforcement properties can be achieved by adding carbon, glass, Kevlar and nano-organic or inorganic reinforcement materials. Such reinforcement fillers may be present in any useful amount, and desirably in an amount of from about 5 to about 50% by weight and desirably about 10% to about 30% by weight of the composition.

The compositions of the present invention may further include various additional components, such as viscosity modifiers, pigments and coloring agents, plasticizers, stabilizers, moisture scavengers, and other such additives in amounts suitable to achieve their intended purpose. The compositions may include other additives, such as latent amines, e.g., the commercially available product Hardener OZ (a latent aliphatic polyaminoalcohol based on polyurethane bisoxazolidine, sold by Bayer Material Science, Pittsburgh, Pa.). The latent amine may be present in an amount of from about 0.1 to about 10% by weight of the composition, and desirably about 0.1 to about 1.0% by weight of the composition.

Compositions described herein may include one or more "moisture scavengers" present in an amount of from about 0.1 to about 10.0% by weight of the composition. Such moisture scavengers include alkali metals, silicates, and molecular silols formed from such silicates. Also of practical importance are ortho-ester materials which can be added to remove water by a hydrolysis reaction.

The compositions described herein may additionally include one or more moisture cure catalysts. Useful moisture cure catalysts include metal salts typically selected from titanium, tin, zirconium, and combinations thereof. Suitable moisture cure catalysts include organo-metal catalysts including titanates, such as tetraisopropylorthotitanate and tetrabutoxyorthotitanate, as well as metal carboxylates such as dibutyltin laurate and dibutyltin dioctoate.

Nonlimiting examples of moisture cure catalysts include, for example, dibutyltin dilaurate, dibutyltin diacetate, dibutyltin dioctoate, dibutyltin maleate, dialkyl tin hexoate, dioctyltin dilaurate, iron octanoate, zinc octanoate, lead octanoate, cobalt naphthenate, tetrapropyltitanate and tetrabutyltitanate. Other useful moisture cure catalysts, such as those disclosed in U.S. Pat. No. 4,111,890, may also be employed and are hereby incorporated by reference. The moisture cure catalysts, if present, may be incorporated in any amount sufficient to effectuate cure and desirably from about 0.1 to about 10% by weight of the composition.

Other useful additives include p-toluenesulphonyl isocyanate (a catalyst), and as well as a commercially available additive sold under the name BYK-500, (Byk-Chemie, Germany).

The compositions described herein may be used to adhere and/or seal various mating parts. In one method, a composition as described above is prepared. Two parts to be joined are provided, with one of the parts being designed to engage the other to form a connection. The prepared composition is applied to at least one of the parts, with the composition being applied at least partially on the area that will be either inside the bond line or outside the bond line, or both areas. The two areas are then mated together, and the composition is allowed to moisture cure. In some embodiments, more than two parts may be connected together. In some embodiments, the parts are threaded and include a male threaded part and a female threaded part, which are designed to be matably connected. In these embodiments, the composition may be applied to either the male part, the female part, or both.

The composition may be allowed to cure for any desired length of time, and in some embodiments, the composition begins to develop cure strength in about 4 to about 8 hours. In some embodiments, the composition is allowed to cure for 24 hours, and in other embodiments the composition is allowed to cure for 48 to 72 hours. The composition is desirably cured at about room temperature, but the composition may be allowed to cure at higher or lower temperatures. As it cures, the composition becomes dry-to-the-touch at the areas of the mated parts that are exposed to the air (i.e., outside the bond line).

As discussed above, the cured composition desirably has a break/prevail strength comparable to or higher than previous threadlocking compositions on active surfaces, and higher strengths on inactive surfaces. The cured composition desirably has a break/prevail strength of at least about 100/10 in-lb after 24 hours of curing at room temperature. After the composition is applied, the threaded parts are connected and the composition is allowed to cure, the resulting assembly exhibits its superior strength, and can only be separated upon the exertion of a high level of force acted upon the threaded part(s). Areas at or outside of the bondline are dry-to-the-touch when cured.

The compositions described herein may be better understood through the non-limiting Examples described below.

EXAMPLES

Example 1

Inventive thread locking compositions A-D were prepared and compared to two commercially available thread-locking compositions. Each of the compositions were tested on steel (stainless steel and zinc nuts and bolts) under various conditions as listed in the Table. Comparative data is shown below:

TABLE 1

| Formulation | Commercially Available Threadlocker[1] 1 | Commercially Available Threadlocker[2] 2 | A | B | C | D |
|---|---|---|---|---|---|---|
| Rubinate 9511[4] | | | 91.5 | 89 | 84 | — |
| Calcium Carbonate | | | 7.5 | — | — | — |
| Desmodure E-23A[4] | | | — | — | — | 89 |
| Aluminum Oxide | | | — | 10 | 15 | 10 |
| Hardener[3] | | | 1 | 1 | 1 | 1 |
| Viscosity (cP) | 1200 | — | 1342 | 1370 | 1930 | 2068 |
| Shelf Life | | | | | | |
| Curing Characteristics | Does not cure outside bond line | Does not cure outside bond line | Cures outside bond line, Dry to touch | Cures outside bond line, Dry to touch | Cures outside bond line, Dry to touch | Cures outside bond line, Dry to touch |
| Substrate Sensitivity | Sensitive | Sensitive | None | None | None | None |
| Breaky/Prevail strength (in-lb), steel[5] | 90/25 | 72/13 | 102/17 | 73/17 | 93/17 | 68/23 |
| Breakaway/Prevail strength (in-lb), stainless steel[5] | 9/3 | 40/2 | 124/15 | 135/17 | 114/11 | 60/12 |
| Breakaway/Prevail strength (in-lb), zinc nuts/bolts[5] | 29/3 | 23/4 | 126/23 | 151/42 | 140/23 | — |
| Break/Prevail (in-lb), steel, aged 150° C., 2 weeks | 35/27 | 49/37 | 147/18 | 196/35 | 175/43 | 156/24 |
| Break/Prevail (in-lb), steel, aged 121° C., 2 weeks | 84/24 | 89/34 | 216/33 | 183/47 | 218/76 | 284/100 |
| Break/Prevail (in-lb), steel, aged 49° C./95% RH, 2 weeks | 44/15 | 70/30 | 105/19 | 146/35 | 113/35 | 131/38 |

[1]Loctite Anaerobic Threadlocker 242 (dimethacrylate ester)
[2]3M; (dimethacrylate ester)
[3]Aliphatic Latent amine
[4]Polyether modified MDI The compositions were applied to nuts and bolts made from various materials, including stainless steel, zinc and plastic, in order to test for their ability to cure and provide threadlocking strength on different substrate surfaces (Substrate Sensitivity). The comparative anaerobic products were surface sensitive, meaning that the type of substrate, e.g., those substrates containing iron or copper ions (steel), as opposed to stainless steel, zinc or plastic surfaces, affected the ability to cure and develop strength. Anaerobic compositions are dependent on a redox reaction for cure and thus work better on surfaces containing iron or copper. The inventive compositions are not dependent on the substrate for their cure mechanism, and as such are substrate insensitive.

All of the compositions were tested as to whether they were dry-to-the-touch at the bondline. Neither commercially available anaerobic threadlocking compositions (Compositions 1 and 2) were dry-to-the-touch at the bondline. The inventive compositions all were dry-to-the-touch at the bondline.

Breakaway/Prevail tests of the nut and bolt assemblies were performed and the tests results set forth in Table 1. The inventive compositions exhibited either higher or equivalent results as the commercially available anaerobic products when tested on steel. However, when tested on stainless steel and zinc (inactive surfaces), the inventive compositions demonstrated significantly higher break/prevail strengths as shown in the table. Moreover, the break/prevail strengths when heat aged for two (2) weeks at 121° C. and 150° C. also were significantly higher as compared to the commercially available anaerobic products on the same substrates. Break/prevail strengths were dramatically (about 50%) higher at 121° C. and 150° C. as compared to the commercial threadlockers, and samples aged at 49° C./95% RH were also higher and showed no loss of strength due to heat aging.

Example 2

A series of different molecular weight moisture curable polymers were evaluated, each having the polymeric backbones described in the footnotes and NCO content ranges as specified in Table 2. Compositions were made using these polymers conforming to this general composition: (% by weight of total composition)

| | |
|---|---|
| Moisture Curable Polymer | 30-95% |
| Latent Amine | 0.5-10% |
| Reinforcement Filler | 5-50.0% |
| Moisture Scavenger | 0.1-10% |

As can be seen above, data indicated that the inventive compositions containing modified MDI polymers and having an NCO content available for moisture cure of about 8% to 18% exhibited dry-to-the-touch characteristics at or outside of the bondline, and a high break/prevail strength. Such inventive compositions provided more desirable threadlocking and sealant performances as compared to the formulations not using moisture curing polymers having the 8% to 18% residual NCO content. Additionally, compositions outside of this NCO range exhibited either poor strength, poor reactivity (not cured) or both. For example, compositions C, F and G were made from modified diisocyanate prepolymers which did not provide an NCO content in the range of 8% to 18% and did not result in sufficient moisture cure to provide adequate strength. As this Table demonstrates, polymers and prepolymers made from modified MDI and which have an NCO content of 8% to 18% performed well on the substrates tested and were dry-to-the-touch in open air once cured.

The invention claimed is:
1. A method of curing mated threaded parts comprising:
(a) providing a composition comprising:
(i) a moisture curable modified methylene diisocyanate (MDI) polymer having a residual NCO content of about 8% to 18% by weight of the polymer;
(ii) a moisture curable catalyst; and
(iii) a reinforcement filler;
(b) applying the composition to a threaded part;
(c) mating the threaded part with another threaded part; and
(d) permitting the composition to moisture cure.
2. The method of claim 1, wherein the moisture curable polymer has an NCO content of about 16% to about 18% by weight.

TABLE 2

| | COMPOSITIONS (% wt.) | | | | | | | | |
|---|---|---|---|---|---|---|---|---|---|
| Components | A | B | C | D | E | F | G | NCO % | NCO² |
| Rubinate 9511[a] | 99 | — | — | — | — | — | — | 16 | 2.4 |
| Demodur E-23 [b] | — | 99 | — | — | — | — | — | 16.4-17 | >2 |
| Rubinate 1234[c] | — | — | 99 | — | — | — | — | 18.6 | 2 |
| Rubinate 9234[d] | — | — | — | 99 | — | — | — | 18.0 | 2.5 |
| Rubinate 9272[e] | — | — | — | — | 99 | — | — | 8 | 2 |
| Suprasac TDI 5025[f] | — | — | — | — | — | 99 | — | 31.2 | 2.7 |
| Desmodur E3265[g] | — | — | — | — | — | — | 99 | 10 | — |
| Hardener[h] | 1.0 | 1.0 | 1.0 | 1.0 | 1.0 | 1.0 | 1.0 | — | — |
| Viscosity (cP) | 2,500 | 1,030 | 1,400 | 3,400 | 3,000 | 500 | 1,600 | — | — |
| Curing Characteristics[1] | High break/prevail cured outside bond line | High break/prevail cured outside bond line | Cheesy/weak remained wet outside of bond line | Moderate cure, low strength | Slow cure, low strength | No moisture cure | Poor reactivity | | |
| Breakaway/prevail strength (in-lb) steel | 90/25 | 69/31 | 22/3 | 17/3 | 10/5 | 6/4 | 26/6 | — | — |

Note:
[1]Samples cured for 48 hours at RT
[2]NCO Functionality
[a]Polyether modified MDI
[b]Polyether modified MDI
[c]Polyester modified MDI
[d]Polyether modified MDI
[e]Polyether modified MDI
[f]Modified toluene diisocyanate (TDI)
[g]Modified hexamethylene diisocyanate (HDI)

3. The method of claim 1, wherein the moisture curable polymer is a polyester modified MDI.

4. The method of claim 1, wherein the moisture curable polymer is a polyether modified MDI.

5. The method of claim 1, wherein the moisture curable polymer is present in amounts of about 30% to about 95% by weight of the total composition.

6. The method of claim 1, wherein the break/prevail values after 48 hour room temperature cure are at least 90/10 in-lb.

7. The method of claim 1, wherein the composition is dry-to-the-touch at an area of the mated thread parts exposed to air.

8. The method of claim 1, wherein the composition has a viscosity of about 1000 to about 4000 cps at room temperature.

9. A moisture curable threadlocking composition comprising:
 (a) a polyester or polyether polymer having a residual NCO content of about 16% to about 18% by weight of the polymer;
 (b) a moisture cure catalyst; and
 (c) a reinforcement filler;
wherein the composition provides a break/prevail strength of 100/10 in-lb after 4 to 8 hours of cure at 120° C.

10. The composition of claim 9, wherein the break/prevail strength of at least 100/10 is obtained after 24 room temperature cure.

11. The composition of claim 9, wherein the polymer is present in amounts of about 30% to about 95% by weight of the total polymer.

12. The composition of claim 9, wherein the polymer has a viscosity in the range of about 1000 to about 3000 cps at room temperature.

13. A threaded assembly comprising:
 (a) a male threaded part matingly assembly with a female threaded part;
 (b) a threadlocking composition comprising:
  (i) a moisture curable modified methylene diisocyanate prepolymer having a residual NCO content of about 8% to about 18% by weight of the polymer;
  (ii) a moisture curable catalyst; and
  (iii) a reinforcement filler.

* * * * *